(12) United States Patent
Dinev et al.

(10) Patent No.: US 12,682,500 B2
(45) Date of Patent: Jul. 14, 2026

(54) HIGH-FIDELITY NEURAL RENDERING OF IMAGES

(71) Applicant: SAMSUNG ELECTRONICS CO., LTD., Gyeonggi-Do (KR)

(72) Inventors: Dimitar Petkov Dinev, Sunnyvale, CA (US); Siddarth Ravichandran, Santa Clara, CA (US); Hyun Jae Kang, Mountain View, CA (US); Ondrej Texler, San Jose, CA (US); Anthony Sylvain Jean-Yves Liot, San Jose, CA (US); Sajid Sadi, San Jose, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 335 days.

(21) Appl. No.: 18/430,369

(22) Filed: Feb. 16, 2024

(65) Prior Publication Data

US 2024/0354997 A1 Oct. 24, 2024

Related U.S. Application Data

(60) Provisional application No. 63/461,199, filed on Apr. 21, 2023.

(51) Int. Cl.
*G06T 9/00* (2006.01)
*G06T 3/40* (2024.01)
(Continued)

(52) U.S. Cl.
CPC .................. *G06T 9/00* (2013.01); *G06T 3/40* (2013.01); *G06T 11/00* (2013.01); *G06V 10/771* (2022.01)

(58) Field of Classification Search
CPC ... G06T 9/00; G06T 3/40; G06T 11/00; G06T 17/00; G06V 10/771; G06V 10/82; G06N 3/02; G06N 3/08; G06N 3/0455
See application file for complete search history.

(56) References Cited

U.S. PATENT DOCUMENTS

| | | | |
|---|---|---|---|
| 2019/0220977 A1* | 7/2019 | Zhou | G06N 3/09 |
| 2021/0133966 A1* | 5/2021 | Fuchs | G06T 7/11 |

(Continued)

FOREIGN PATENT DOCUMENTS

| | | |
|---|---|---|
| KR | 10-2259877 B1 | 6/2021 |
| KR | 10-2514708 B | 3/2023 |

(Continued)

OTHER PUBLICATIONS

Zhou; Yi-Fan et al. "BranchGAN: Unsupervised Mutual Image-to-Image Transfer with a Single Encoder and Dual Decoders", Dec. 2019, IEEE (Year: 2019).*

(Continued)

*Primary Examiner* — John Villecco
*Assistant Examiner* — Alejandro Hernandez
(74) *Attorney, Agent, or Firm* — Kevin T. Cuenot

(57) ABSTRACT

Generating images includes generating encoded data by encoding input data into a latent space. The encoded data is decoded through a first decoder having first decoder layers by processing the encoded data through one or more of the first decoder layers. The encoded data is decoded through a second decoder having second decoder layers by processing the encoded data through one or more of the second decoder layers. An updated feature map is generated by replacing at least a portion of a feature map output from a selected layer of the first decoder layers with at least a portion of a feature map output from a selected layer of the second decoder layers. An image is generated by further decoding the updated feature map through one or more additional layers of the first decoder layers.

20 Claims, 8 Drawing Sheets

(51) Int. Cl.
  *G06T 11/00* (2026.01)
  *G06V 10/771* (2022.01)

(56) References Cited

U.S. PATENT DOCUMENTS

| | | | | |
|---|---|---|---|---|
| 2021/0174513 A1* | 6/2021 | Chidlovskii | .............. | G06T 7/11 |
| 2021/0272325 A1 | 9/2021 | Lee et al. | | |
| 2021/0350245 A1 | 11/2021 | Lee et al. | | |
| 2021/0390323 A1* | 12/2021 | Guo | .......................... | G06N 3/04 |
| 2022/0222914 A1* | 7/2022 | Pradhan | ............ | G06F 18/24133 |
| 2022/0398783 A1* | 12/2022 | Hu | ........................ | G06N 3/0455 |
| 2023/0071559 A1* | 3/2023 | Wang | ........................ | G06T 7/80 |
| 2023/0351157 A1 | 11/2023 | Namgoong et al. | | |
| 2023/0362378 A1* | 11/2023 | Ma | ......................... | H04N 19/23 |
| 2024/0087170 A1* | 3/2024 | Domanski | ............ | H04N 19/597 |
| 2024/0202983 A1* | 6/2024 | Zhu | .......................... | G06T 11/00 |
| 2024/0212335 A1* | 6/2024 | Qin, I | ................... | G06N 3/0464 |
| 2025/0211765 A1* | 6/2025 | Gao | ........................ | H04N 19/30 |
| 2025/0330624 A1* | 10/2025 | Chen | ...................... | H04N 19/42 |

FOREIGN PATENT DOCUMENTS

| | | | |
|---|---|---|---|
| KR | 10-2023-0052880 A | | 4/2023 |
| TW | 202036395 A | * | 10/2020 |

OTHER PUBLICATIONS

Runlong; Liao "MTCGAN: Mini CycleGAN with Tokenized MLP for Unpaired Image-to-Image Translation", Oct. 2023, IEEE (Year: 2023).*

WIPO Appln. No. PCT/KR2024/003056, Written Opinion, Jun. 10, 2024, 4 pg.

WIPO Appln. No. PCT/KR2024/003056, Int'l. Search Report, Jun. 10, 2024, 3 pg.

Grace Period Disclosure: "Synthesizing Photorealistic Virtual Humans Through Cross-modal Disentanglement," Siddarth Ravichandran, OndRej Texler, Dimitar Dinev, and Hyun Jae Kang, Mar. 24, 2023, pp. 1-12, [arXiv preprint, arXiv No. 2209.01320v2, 12 PG.].

Prajwal, KR et al., "A lip sync expert is all you need for speech to lip generation in the wild," In Proceedings of the 28th ACM International Conference on Multimedia, Oct. 12, 2020, pp. 484-492.

"Best AI Video Generator in 2024—Synthesia," [online] Synthesia Limited © 2024 [retrieved Jan. 25, 2024], retrieved from the Internet: <https://www.synthesia.io/>, 9 pg.

\* cited by examiner

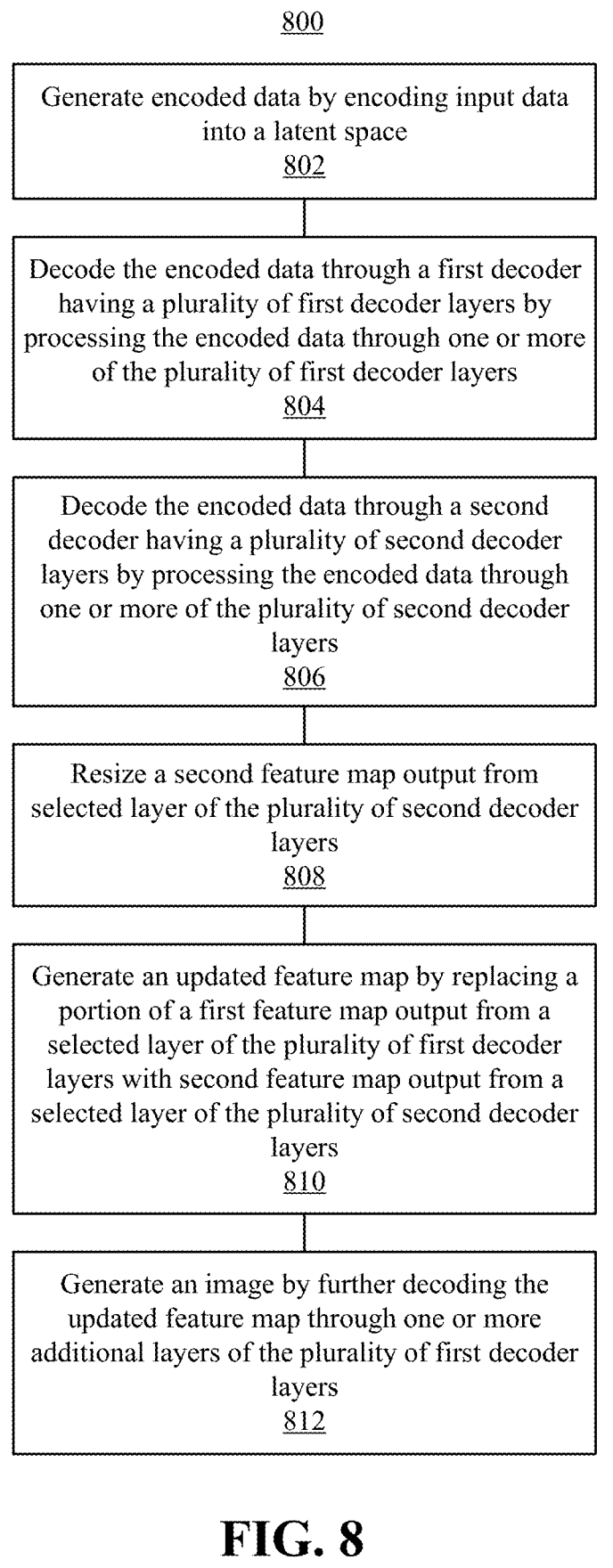

800

Generate encoded data by encoding input data
into a latent space
802

Decode the encoded data through a first decoder
having a plurality of first decoder layers by
processing the encoded data through one or more
of the plurality of first decoder layers
804

Decode the encoded data through a second
decoder having a plurality of second decoder
layers by processing the encoded data through
one or more of the plurality of second decoder
layers
806

Resize a second feature map output from
selected layer of the plurality of second decoder
layers
808

Generate an updated feature map by replacing a
portion of a first feature map output from a
selected layer of the plurality of first decoder
layers with second feature map output from a
selected layer of the plurality of second decoder
layers
810

Generate an image by further decoding the
updated feature map through one or more
additional layers of the plurality of first decoder
layers
812

FIG. 8

HIGH-FIDELITY NEURAL RENDERING OF IMAGES

CROSS-REFERENCE TO RELATED APPLICATIONS

This application claims the benefit of U.S. Application No. 63/461,199 filed on Apr. 21, 2023, which is fully incorporated herein by reference.

STATEMENT REGARDING PRIOR DISCLOSURES BY THE INVENTOR OR A JOINT INVENTOR

The following disclosure(s) are submitted under 35 U.S.C. 102(b)(1)(A):

DISCLOSURE(S): "Synthesizing Photorealistic Virtual Humans Through Cross-modal Disentanglement," Siddarth Ravichandran, Ondřej Texler, Dimitar Dinev, and Hyun Jae Kang, Mar. 24, 2023, pps. 1-12.

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to high-fidelity, neural rendering of images.

BACKGROUND

The use of life-like avatars referred to as digital humans or virtual humans is becoming increasingly popular. Digital humans may be used in a variety of different contexts including, but not limited to, the metaverse, gaming, and as part of any of a variety of virtual experiences in which human beings increasingly wish to take part. Advances in computer technology and neural networks have enabled the rapid virtualization of many different "real world" activities.

The creation of high-fidelity images, e.g., images with little or reduced distortion, including those specifying digital humans using neural networks and/or deep learning has been, and remains, a complex task. Images such as those specifying a digital human must be of such high quality that when rendered as video, the digital human interacts with a human being, e.g., by engaging in interactive dialog, in a believable manner. This entails overcoming challenges relating to the generation of a highly detailed visual rendering of the digital human and the generation of believable and natural animations synchronized with audio (e.g., speech). In many cases, a high resolution and high-quality rendering of a digital human is important as the digital human may be displayed on a large screen or on a display of a mobile device that is held close to the user's face making any visual artifacts or irregularities in the digital human very noticeable.

SUMMARY

In one or more embodiments, a method includes generating encoded data by encoding input data into a latent space. The method also includes decoding the encoded data through a first decoder having a plurality of first decoder layers by processing the encoded data through one or more of the plurality of first decoder layers. The method also includes decoding the encoded data through a second decoder having a plurality of second decoder layers by processing the encoded data through one or more of the plurality of second decoder layers. The method also includes generating an updated feature map by replacing at least a portion of a first feature map output from a selected layer of the plurality of first decoder layers with at least a portion of a second feature map output from a selected layer of the plurality of second decoder layers. The method also includes generating an image by further decoding the updated feature map through one or more additional layers of the plurality of first decoder layers.

In one or more embodiments a system, apparatus, and/or device includes a processor configured to execute operations including generating encoded data by encoding input data into a latent space. The operations also include decoding the encoded data through a first decoder having a plurality of first decoder layers by processing the encoded data through one or more of the plurality of first decoder layers. The operations also include decoding the encoded data through a second decoder having a plurality of second decoder layers by processing the encoded data through one or more of the plurality of second decoder layers. The operations also include generating an updated feature map by replacing a portion of at least a first feature map output from a selected layer of the plurality of first decoder layers with at least a portion of a second feature map output from a selected layer of the plurality of second decoder layers. The operations also include generating an image by further decoding the updated feature map through one or more additional layers of the plurality of first decoder layers.

In one or more embodiments, a computer program product includes one or more computer readable storage media. Program instructions are collectively stored on the one or more computer storage media. The program instructions are executable by computer hardware to initiate operations. The operations include generating encoded data by encoding input data into a latent space. The operations also include decoding the encoded data through a first decoder having a plurality of first decoder layers by processing the encoded data through one or more of the plurality of first decoder layers. The operations also include decoding the encoded data through a second decoder having a plurality of second decoder layers by processing the encoded data through one or more of the plurality of second decoder layers. The operations also include generating an updated feature map by replacing at least a portion of a first feature map output from a selected layer of the plurality of first decoder layers with at least a portion of a second feature map output from a selected layer of the plurality of second decoder layers. The operations also include generating an image by further decoding the updated feature map through one or more additional layers of the plurality of first decoder layers.

In one or more embodiments, a system includes an encoder configured to generate encoded data by encoding input data into a latent space. The system includes a first decoder having a plurality of first decoder layers. The first decoder is configured to decode the encoded data through one or more of the plurality of first decoder layers. The system includes a second decoder having a plurality of second decoder layers. The second decoder is configured to decode the encoded data through one or more of the plurality of second decoder layers. The first decoder is configured to generate an updated feature map by replacing at least a portion of a first feature map output from a selected layer of the plurality of first decoder layers with at least a portion of a second feature map output from a selected layer of the plurality of second decoder layers. The first decoder is further configured to generate an image by further decoding the updated feature map through one or more additional layers of the plurality of first decoder layers.

This Summary section is provided merely to introduce certain concepts and not to identify any key or essential features of the claimed subject matter. Many other features and embodiments of the disclosed technology will be apparent from the accompanying drawings and from the following detailed description.

BRIEF DESCRIPTION OF THE DRAWINGS

The accompanying drawings show one or more embodiments; however, the accompanying drawings should not be taken to limit the disclosed technology to only the embodiments shown. Various aspects and advantages will become apparent upon review of the following detailed description and upon reference to the drawings.

FIG. 8 illustrates a method of generating an image in accordance with one or more embodiments of the disclosed technology.

DETAILED DESCRIPTION

Figure 1:
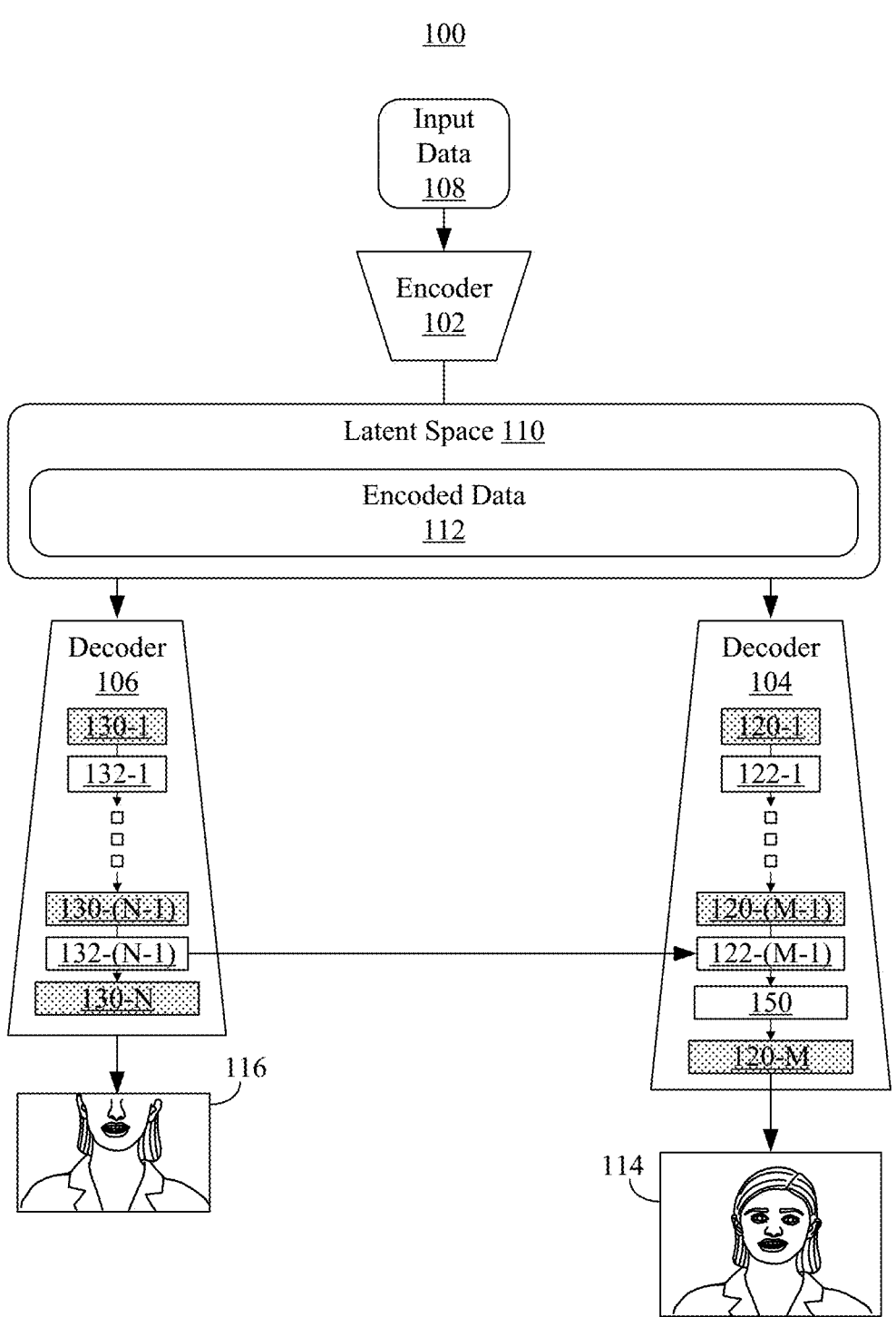
FIG. 1 illustrates an executable framework for rendering images in accordance with one or more embodiments of the disclosed technology.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to high-fidelity, neural rendering of images. In generating high-fidelity images, care is required to generate realistic features. For purposes of illustration, consider a high-fidelity image of a face. Care is required to generate realistic features such as those in the mouth region of the face. The mouth region includes detailed facial features such as lips, teeth, the oral cavity, and the like. In order to bring a sufficient level of realism to the image, such features should be generated with sufficient realism to possibly deceive a human being interacting with the image or a video generated from a plurality of generated images or to ensure that the human being is not uncomfortable interacting with the image or such a video. For example, in the case of generating images specifying a digital human, the digital human should be rendered to provide a sufficient level of realism such that a human is comfortable interacting with the digital human.

In accordance with the inventive arrangements disclosed herein, methods, systems, and computer program products are provided that are capable of generating or rendering images with high-fidelity. Within this disclosure, the terms "high-fidelity" and "high-quality" are used interchangeably. In general, the term "high-fidelity" refers to an object generated using a generative network (e.g., a generative artificial intelligence (AI) system), e.g., an image, having a level of distortion below a particular level or having reduced distortion. In some embodiments, the generative network is capable of focusing on one or more selected portions of the image to be generated, also referred to herein as "regions of interest" or "ROIs," to enhance the quality of the ROIs. In cases where the image specifies a face, the selected portion of the image, or ROI, may be, or include, the mouth region of the face. The ROI, being a portion of the image to be generated, is a localized region of that image. The face specified by the image may be a human face such as the face of a digital human.

In one or more embodiments, a digital human is a computer-generated entity that is rendered visually with a human-like appearance. The digital human may be an avatar. In some embodiments, a digital human is a photorealistic avatar. In some embodiments, a digital human is a digital rendering of a hominid, a humanoid, a human, or other human-like character. A digital human may be an artificial human. A digital human can include elements of artificial intelligence (AI) for interpreting user input and responding to the input in a contextually appropriate manner. The digital human can interact with a user using verbal and/or non-verbal cues. Implementing natural language processing (NLP), a chatbot, and/or other software, the digital human can be configured to provide human-like interactions with a human being and/or perform activities such as scheduling, initiating, terminating, and/or monitoring of the operations of various systems and devices.

In one or more embodiments, methods, systems, and computer program products are disclosed that are capable of generating high-fidelity images. The inventive arrangements are capable of generating encoded data by encoding input data into a latent space. The encoded data may be decoded through a first decoder having a plurality of first decoder layers by processing the encoded data through one or more of the plurality of first decoder layers. For example, the encoded data may be processed through fewer than all of the plurality of first decoder layers. The encoded data may be decoded through a second decoder having a plurality of second decoder layers by processing the encoded data through one or more of the plurality of second decoder layers. The encoded data may be processed through fewer than all of the plurality of second decoder layers. An updated feature map is generated by replacing at least a portion of a first feature map output from a selected layer of the plurality of first decoder layers with at least a portion of a second feature map output from a selected layer of the plurality of second decoder layers. An image is generated by further decoding the updated feature map through one or more additional layers of the plurality of first decoder layers.

One or more technical effects include using a second decoder trained to generate high-fidelity images of certain portion(s) or ROIs of the image to be generated. The second decoder is capable of generating an image of such ROI(s) with greater detail than is achieved, for the ROI, by the first decoder. One or more technical effects include both the first decoder and the second decoder operating on input data encoded into a same latent space. This alleviates the need to utilize more than one encoder or an encoder for each decoder used.

In one or more embodiments, the selected layer of the plurality of first decoder layers is a penultimate layer of the plurality of first decoder layers. That is, the selected layer may be the second to last layer or layer M-1 of M first decoder layers.

In one or more embodiments, the selected layer of the plurality of second decoder layers is a penultimate layer of the plurality of second decoder layers. That is, the selected layer may be the second to last layer or layer N-1 of N second decoder layers.

One or more technical effects of replacing the feature map (or at least a portion thereof) in the penultimate layer of the first decoder is that the final image output from the first decoder smooths the edges surrounding the portion of the first feature map that was replaced by the second feature map (or at least a portion thereof). That is, the final layer of the first decoder smooths artifacts from the replacing operation resulting in a higher-fidelity image being output. This better integrates the second feature map into the first feature map. That is, edges or boundary between the second feature map and the first feature map in the updated feature map are smoothed out and appear more photo-realistic and/or have no or fewer noticeable artifacts in the final image.

In one or more embodiments, the second feature map is resized to correspond to a size of the portion of the first feature map. For example, the second feature map may be resized to match the portion of the first feature map being replaced. One or more technical effects of resizing include allowing a second decoder to be used that outputs images in any of a variety of different resolutions including higher resolutions with greater detail devoted to the ROI. Thus, the second decoder may output a second feature map having a higher resolution than the portion of the first feature map being replaced. The resizing may maintain detail of the second feature map such that the replacing operation provides the first feature map with greater detail in the replaced portion.

In one or more embodiments, the image is a red, green, blue (RGB) image.

In one or more embodiments, the first decoder is trained to generate images including a face of a digital human.

In one or more embodiments, the second decoder is trained to generate images including a mouth of the digital human.

In one or more embodiments, the encoded data is decoded through one or more additional decoders each having a plurality decoder layers by processing the encoded data through one or more of the plurality of decoder layers of each of the one or more additional decoders. In that case, the updated feature map is generated by replacing one or more additional portions of the first feature map with a further feature map output from a selected layer of the plurality of decoder layers from each of the one or more additional decoders. One or more technical effects include using a dedicated decoder for each different portion, or ROI, in the image to be generated. This allows each decoder to be dedicated (e.g., trained) to generate high-fidelity images directed to a particular ROI having its own set of particular detailed features.

In one or more embodiments, an output from a final layer of the plurality of second decoder layers of the second decoder is used only during training of the second decoder.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an executable framework 100 for rendering images in accordance with one or more embodiments of the disclosed technology. Framework 100 is executable by one or more interconnected data processing systems (e.g., computers). An example of a data processing system that is suitable for executing framework 100 is described in connection with FIG. 5. FIG. 1 illustrates a runtime, or inference, implementation of framework 100. As such, certain aspects of framework 100, though described below, are not illustrated in FIG. 1.

In one or more embodiments, framework 100 is implemented as a network, i.e., a generative network, including one or more variational autoencoder networks. An autoencoder network generally refers to an unsupervised artificial neural network that learns how to efficiently compress and encode data. The data is encoded into a latent space. The autoencoder learns how to reconstruct the data back from the encoded representation to a representation that is as close to the original input as possible. A variational autoencoder network is an autoencoder whose encodings distribution is regularized during the training in order to ensure that the latent space has properties sufficient to allow the generation of some portion of new data.

Autoencoder networks typically have a single encoder-decoder path whose purpose is to compress information into a reduced feature space, referred to as the latent space, and then decompress the data to reconstruct the original data. More complex networks may include multimodal input that may use several autoencoder networks operating in parallel. Each network used will include its own encoder-decoder path. In some cases, the latent spaces of the different encoders may be concatenated to merge different input modes.

In the example of FIG. 1, framework 100 includes an encoder 102 and two or more decoders shown as decoder 104 and decoder 106. The example of FIG. 1 includes two decoders for purposes of illustration. In other embodiments, framework 100 includes more than two decoders. Framework 100 is capable of generating high-fidelity images. The images, as generated by framework 100, are high-fidelity at least in part in view of special focus or attention placed on selected portion(s) or ROIs of the resulting image. Those portions or ROIs may be semantically important to the resulting image that is generated.

In one aspect, encoder 102 is capable of receiving input data 108 and encoding input data 108 into latent space 110 as encoded data 112. In one or more example implementations, input data 108 may be sparse image data such as an image that includes only one or more contours, only or one or more keypoints, or only one or more contours and one or more keypoints. In such examples, input data 108 is not an RGB image as input data 108 contains significantly less data than an RGB image. In the example of FIG. 1, both decoder 104 and decoder 106 operate on encoded data 112, or portions thereof. As such, both decoder 104 and decoder 106 are configured to receive input from latent space 110. That is, both decoder 104 and decoder 106 utilize the same latent space, i.e., latent space 110. In the example of FIG. 1, latent space 110 is obtained using a single encoder. The same latent space 110 is decoded using two (or more) different decoders. In this example, the decoders are trained differently and operate collectively in performing inference to recreate or generate a high-quality RGB image.

In the example, decoder 104 may be considered a "main decoder" in that decoder 104, e.g., also referred to herein as the "first decoder") generates a final image shown as image 114. In one or more embodiments, image 114 is an RGB image. Decoder 104, in operating with encoder 102, is trained to generate images, e.g., RGB images, from input data based on a ground truth image (not shown).

In one or more embodiments, the combination of encoder 102 and decoder 104 forms a VAR network that is trained using a discriminator (not shown). Encoder 102 and decoder 104 may operate as a generator with the discriminator as a Generative Adversarial Network (GAN). In general, a GAN includes two neural networks referred to as a generator and a discriminator that are engaged in a zero-sum game with one another. Given a training data set, e.g., ground truth data, a GAN is capable of learning to generate new data, e.g., image 114, with the same statistics as the training data set.

As an illustrative example, a GAN that is trained on an image or image library is capable of generating different images that appear authentic to a human observer. In a GAN, the generator generates images. The discriminator generates a signal specifying a measure of realism of the images generated by the generator. The signal from the discriminator may be to the generated by way of backpropagation so that the generator may update one or more weights of one or more layers therein. In one or more embodiments, both neural networks may be dynamically updated during operation (e.g., continually trained during operation) so that the GAN is capable of learning in an unsupervised manner where the generator seeks to generate images 114 with increasing measures of realism as determined by the discriminator.

In the example, decoder 104 includes a plurality of layers 120 (e.g., 120-1, . . . , 120-(M-1), 120-M). The plurality of layers of decoder 104 is also referred to herein as first decoder layers or a plurality of first decoder layers. In the example, layers 120 output or generate feature maps 122. As pictured, layer 120-1 generates feature map 122-1 from encoded data 112. Layer 120-(M-1) generates feature map 122-(M-1) based on the feature map from the preceding layer 120. Layer 120-M an updated version of feature map 122-(M-1) shown as updated feature map 150 as input and generates image 114 as output.

Decoder 106, also referred to herein as the "second decoder," may be considered a "high-resolution" decoder. Decoder 106, for example, is capable of providing high-resolution images and is supervised on high-resolution crops/regions of interest in the original image. In one or more embodiments, decoder 106 is trained on high-resolution versions of the ROI. The training data set, for example, may include images (I) at high resolution. Smaller crops of the ROI of the images (I) may be used as the training data with respect to decoder 106. In one or more embodiments, downsized versions of image (I) may be used as training data with respect to decoder 104.

In the example, decoder 106 generates image 116 from encoded data 112. Image 116 may be an RGB image. Image 116 specifies a particular portion (e.g., ROI) of an image such as image 114, albeit in greater detail than the corresponding portion of image 114. For example, both image 114 and image 116 may have a same pixel resolution such that image 116, being a detailed rendering of a portion of image 114, includes greater detail than the corresponding portion of image 114. Decoder 106, for example, may be implemented as a specialized decoder that is configured to only process zoomed-in, high-resolution views of semantically important areas, thereby providing high-quality supervision.

In the example of FIG. 1, the ROI is a mouth region of a face to be generated in image 114. In this regard, encoder 102 and decoder 106 may form a VAR that is trained to generate high quality images of only a selected ROI, which is the mouth region in this example. In one or more embodiments, the combination of encoder 102 and decoder 106 form a VAR network that is trained using a discriminator (not shown). Encoder 102 and decoder 106 may operate as a generator with the discriminator as another GAN that may be trained as previously described with the exception that encoder 102 and decoder 106 are trained to generate image 116, which is a detailed rendering of the particular ROI selected from the training data set (e.g., the ground truth).

In one or more embodiments, decoder 106 is configured to evaluate, or use as input, the entirety of encoded data 112 as opposed to using a portion of encoded data 112 that directly pertains to the ROI. In using the entirety of encoded data 112, decoder 106 is better able to determine or learn region localities and other information relative to the entire image.

In the example, decoder 106 includes a plurality of layers 130 (e.g., 130-1, . . . , 130-(N-1), 130-N). The plurality of layers of decoder 106 is also referred to herein as second decoder layers or a plurality of second decoder layers. In the example, layers 130 output or generate feature maps 132. As pictured, layer 130-1 generates feature map 132-1 from encoded data 112. Layer 130-(N-1) generates feature map 132-(N-1) based on the feature map from the preceding layer 130. Layer 130-N receives feature map 132-(N-1) as input and generates image 116 as output.

In the example of FIG. 1, image 116 is shown to illustrate how decoder 106 is configured. That is, image 116, as output from decoder 106, is used for purposes of training. The discriminator generates a signal specifying a measure of realism of image(s) 116 generated by decoder 106 during training. During runtime, or inference, image 116 is not used. Rather, a selected feature map 132 is provided to decoder 104. Decoder 104 replaces a portion of a selected feature map 122 with the selected feature map 132.

In the example, feature map 132-(N-1) is provided from decoder 106 during runtime and provided to decoder 104. Decoder 104 replaces a portion of feature map 122-(M-1), also referred to herein as the first feature map, with feature map 132-(N-1), also referred to herein as the second feature map. In the example, feature map 132-(N-1) is the output from the penultimate (e.g., second to last) layer 130 of decoder 106. Similarly, feature map 122-(M-1) is the output from the penultimate (e.g., second to last) layer 120 of decoder 104. Image 116 may be discarded during runtime of decoder 106. In one or more embodiments, once decoder

106 is trained, the last layer (e.g., layer 130-N) may be pruned such that the output from decoder 106 when performing inference is feature map 132-(N-1). Appreciably, in the case where the last layer of decoder 106 is pruned, at inference time, the penultimate layer refers to the layer hierarchy of decoder 106 at or during training.

Feature map 122-(M-1) having feature map 132-(N-1) incorporated therein is referred to as an updated feature map shown as updated feature map 150. Updated feature map 150 is processed through one or more additional layers 120 of decoder 104. In the example, updated feature map 150 is feature map 122-(M-1) having feature map 132-(N-1) integrated therein replacing a portion of feature map 122-(M-1). In the example, updated feature map 150 is processed through the final layer 120-M of decoder 104 to produce image 114. In one or more embodiments, M is equal to N. In one or more embodiments, M is not equal to N. For example, M may be greater than N or M may be less than N.

In one or more embodiments, feature map 132-(N-1) may be resized prior to incorporation into feature map 122-(M-1). For example, feature map 132-(N-1) may be resized to match the size of the portion or ROI of feature map 122-(M-1) being replaced with feature map 132-(N-1). In the example of FIG. 1, it should be appreciated that what is being replaced in feature map 122-(M-1) by feature map 132-(N-1) is a portion of, e.g., an amount less than the entirety, of feature map 122-(M-1). In some cases, a portion can include at least a portion, e.g., an amount less than or equal to the entirety.

Conventional generative neural networks typically utilize a convolutional autoencoder that simultaneously learns a low-dimensional space, e.g., a latent space, that encodes latent information about the subject and decodes the pixel values from this latent space. Convolution filters typically pass through the entire image giving equal importance to all regions of the image. This means that such a conventional neural network may over-focus on a high-frequency area, such as hair, rather than focusing on another more semantically important area such as the mouth. The mouth may be considered more semantically important in that mouth realism is more noticeable in the resulting image compared to hair. Increasing the resolution of the generative network does not necessarily translate into increased detail for semantically important regions such as the mouth.

The inventive arrangements illustrated in FIG. 1 are capable of generating a high-quality image in which the semantically important region, e.g., the mouth, is clearer and of higher-quality than is the case with conventional generative neural networks. As discussed, by replacing a portion, e.g., the ROI, of a selected feature map of decoder 104 with a selected feature map of decoder 106, a higher quality final image may be obtained in which the ROI is clearer, more detailed, and/or includes less distortion than would have otherwise been the case. Referring to FIG. 1, decoder 104 replaces the region of the output generated by the penultimate layer of decoder 104 with the output generated by the penultimate layer of decoder 106, which corresponds to the region of output being replaced. The replacement operation inserts a high-quality version of the region being replaced into what will become the final image output by decoder 104. By processing the output with the region replaced as described herein through one (or more additional) layers of decoder 104, image 114 is of high quality and lacks "seam" artifacts that could otherwise appear at the border of the replaced region if the replacement operation were done on the final RGB image output from decoder 104.

Figure 2A:
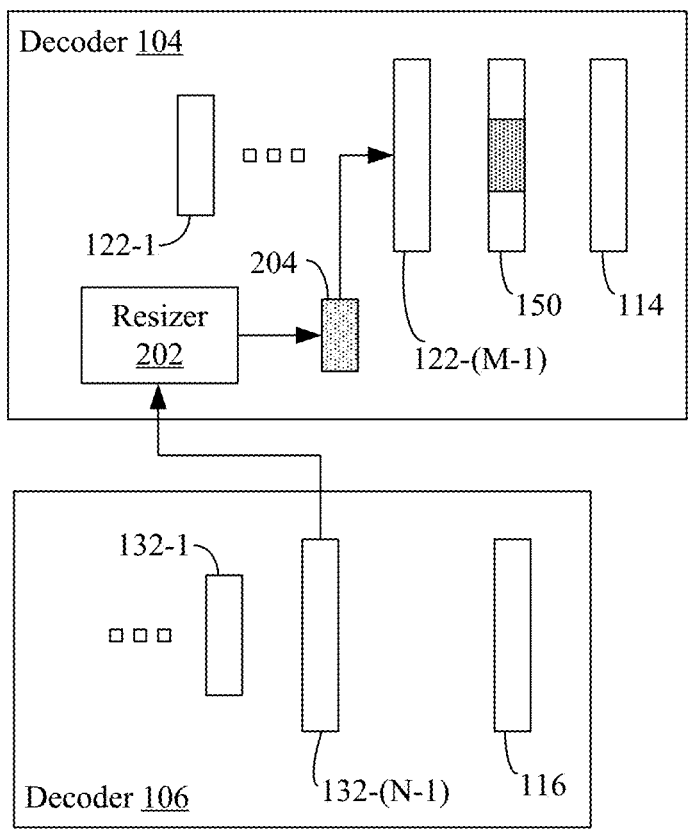
FIG. 2A is an example illustration of a replacement operation performed by the executable framework of FIG. 1.

FIG. 2A is an example illustration of the replacement operation performed by framework 100 of FIG. 1. More particularly, FIG. 2A illustrates the replacement operation as performed by decoder 104. In the example, the various feature maps generated by decoder 104 and decoder 106 may be expressed or specified as tensor data structures. For purposes of illustration, feature map 122-(M-1) may be a 512-pixel feature map with 8 channels. Image 114 may be a 512-pixel image with 3 channels (e.g., RGB). Similarly, feature map 132-(N-1) may be a 512-pixel feature map with 8 channels. Image 116 may be specified as a 512-pixel image having 3 channels (e.g., RGB).

In the example, a portion of feature map 122-(M-1) is removed and replaced with feature map 132-(N-1). A resizer 202 is configured to reduce the size of feature map 132-(N-1) so as to fit within, e.g., match, the size of the portion of feature map 122-(M-1) that is removed. The resized version of feature map 132-(N-1) is illustrated as resized feature map 204. Decoder 104 replaces the portion of feature map 122-(M-1) that is removed with resized feature map 204. Feature map 122-(M-1) is transformed into updated feature map 150 by virtue of the replacement operation described. Updated feature map 150 may be provided to a final layer of decoder 104 to generate image 114.

In some conventional systems, the use of two or more decoders configured to share the same latent space may cause ambiguity. In building digital humans, for example, the ambiguity may interfere with the latent space attempting to learn other regions of a face and cause the two (e.g., or more) decoders to work against one another leading to a lesser quality result. The inventive arrangements address the ambiguity described as follows. In general, merging features in a latent space can be used to condition input or to merge inputs of different modalities. The merging of features may be performed by concatenating the vectorized latent features before passing such features through the rest of the network. In the case of images, it has been observed that layers of a network such as VGG (e.g., a Very Deep Convolutional Network such as VGGNet)) may carry some semantic meaning and can be useful for losses. As the inventive arrangements do utilize convolution layers, locality of the data is preserved. Thus, rather than concatenate the latent spaces (e.g., the feature vectors as encoded in the latent space), the inventive arrangements use the replacement operation as described. That is, an ROI as output from a selected layer in decoder 104 is replaced with the output from a selected layer of decoder 106 as resized. The output from the selected layer of decoder 106, as resized, corresponds to, or matches, the portion of the output from the selected layer of decoder 104 being replaced. The replacement operation makes decoders 104 and 106 work with each other instead of against each other.

Figure 2B:
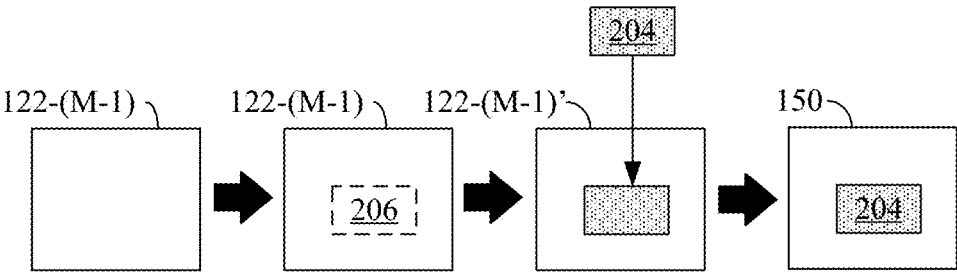
FIG. 2B is another example illustration of the replacement operation performed by the executable framework of FIG. 1.

FIG. 2B is another example illustration of the replacement operation performed by framework 100 of FIG. 1. More particularly, FIG. 2B illustrates the replacement operation as performed by decoder 104. In the example, feature map 122-(M-1) is generated by layer 120-(M-1). Decoder 104 identifies the portion 206 of feature map 122-(M-1) to be removed as illustrated by the dashed bounding box. Decoder 104 removes portion 206 from feature map 122-(M-1) as illustrated by the solid bounding box surrounding the shaded region indicating the removed portion 206, which results in a modified version of feature map 122-(M-1) shown as feature map 122-(M-1)'. Decoder 104 inserts resized feature map 204 into feature map 122-(M-1)' resulting in updated feature map 150 (e.g., an updated version of feature map 122-(M-1)). In updated feature map 150, portion 206 is replaced with resized feature map 204.

Figure 3:
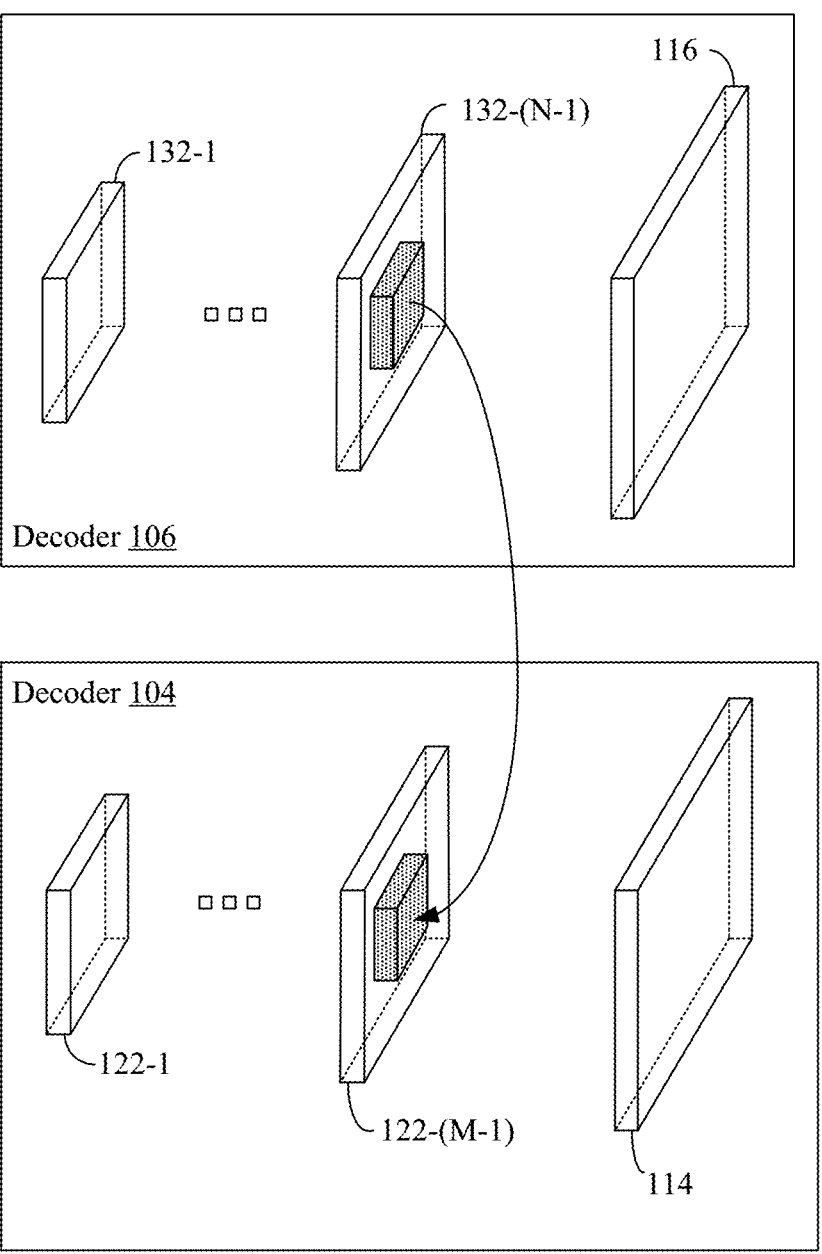
FIG. 3 is another example illustration of the replacement operation performed by the executable framework of FIG. 1.

FIG. 3 is another example illustration of the replacement operation performed by framework 100. For ease of illustration, the resizing operation is not shown.

Figure 4:
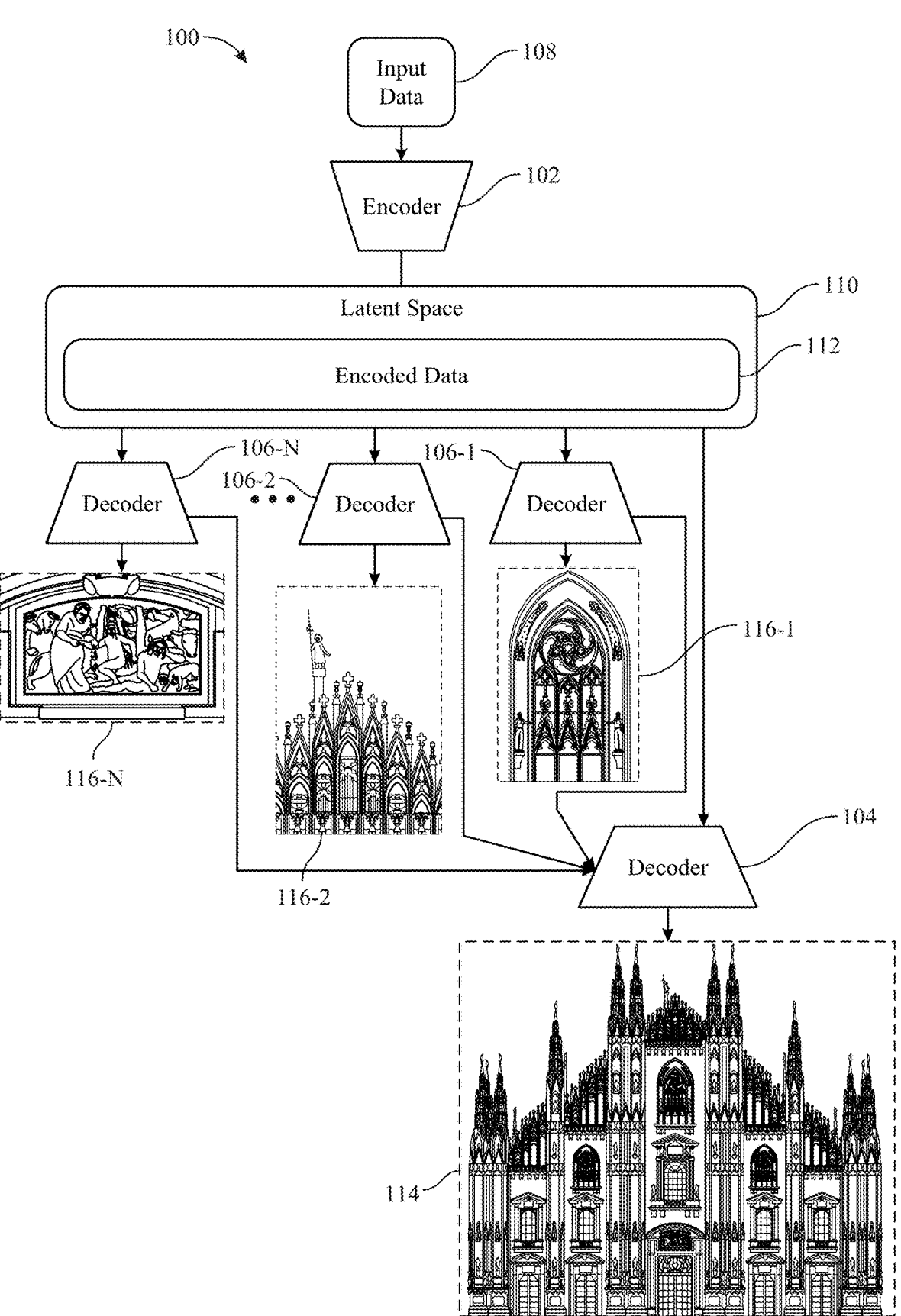
FIG. 4 illustrates another example of the executable framework of FIG. 1.

FIG. 4 illustrates another example of executable framework 100. The example of FIG. 4 is substantially similar to the example of FIG. 1 with the exception that more than two decoders are used. As shown, latent space 110 is still common to each decoder 104, 106-1, 106-2, through 106-N. Each of decoders 106 may be trained to generate an image (e.g., 116-1, 116-2, through 116-N) that is a detailed version of a portion or ROI of image 114. The particular image generated by each of decoders 106-1, 106-2, through 106-N is different and corresponds to a different portion or ROI of image 114. Accordingly, for each of decoders 106-1, 106-2, through 106-N, a feature map generated by a selected layer in the respective decoder is output and provided to decoder 104. As discussed, in some embodiments, once trained, the final layer of one or more or each decoder 106 may be pruned.

In one or more embodiments, each of decoders 106 may be trained as described in connection with FIG. 1. Each decoder 106 may be trained on crops of high resolution images (I) where the crop used for each decoder 106 will vary based on the particular ROI that the decoder is intended to handle.

Decoder 104 removes a portion of the feature map as generated by a selected layer therein for each feature map received from a decoder 106 and replaces the portion of the feature map within decoder 104 with the respective feature maps received from decoders 106. The replacement operation is performed subsequent to resizing the feature maps received from decoders 106. The replacing may be performed on a one-to-one basis. That is, a one-to-one correspondence exists between the portions removed from the feature map of decoder 104 and the resized feature maps received from decoders 106. Appreciably, each feature map provided to decoder 104 may be resized to match the portion being replaced within the feature map of decoder 104. Each feature map from decoders 106 may be resized to fit the corresponding portion to be replaced. Each portion being replaced may be the same size or a different size depending on the feature of the respective region.

In one or more embodiments, the selected layer from which output is obtained from each of decoders 106 and provided to decoder 104 may be the penultimate layer of each decoder 106. Similarly, the selected layer of decoder 104 that generates the feature map within which portions are replaced with resized feature maps from decoders 106 may be the penultimate layer of decoder 106.

In the example of FIG. 4, image 114 is of a building with detailed structural features. For purposes of illustration, the building of image 114 has romantic architectural features that contain a large amount of detail. Each such region with a large amount of detail may be one that is replaced by a feature map generated by a respective decoder 106. As discussed, the updated feature map that has a plurality of portions replaced by feature maps from decoders 106 is processed through one or more further layers of decoder 104.

Figure 5:
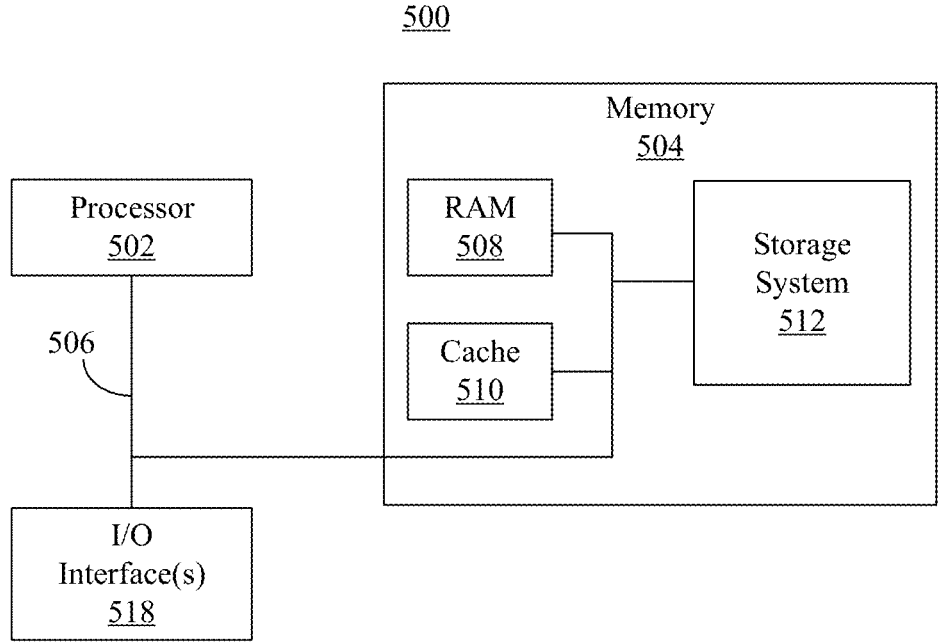
FIG. 5 illustrates an example implementation of a data processing system capable of executing the framework of FIGS. 1 and 4.

FIG. 5 illustrates an example implementation of a data processing system 500. As defined herein, the term "data processing system" means one or more hardware systems configured to process data, each hardware system including at least one processor and memory, wherein the processor is programmed with computer-readable instructions that, upon execution, initiate operations. Data processing system 500 can include a processor 502, a memory 504, and a bus 506 that couples various system components including memory 504 to processor 502.

Processor 502 may be implemented as one or more processors. In an example, processor 502 is implemented as a central processing unit (CPU). Processor 502 may be implemented as one or more circuits, e.g., hardware, capable of carrying out instructions contained in program code. The circuit may be an integrated circuit or embedded in an integrated circuit. Processor 502 may be implemented using a complex instruction set computer architecture (CISC), a reduced instruction set computer architecture (RISC), a vector processing architecture, or other known architecture. Example processors include, but are not limited to, processors having an ×86 type of architecture (IA-32, IA-64, etc.), Power Architecture, ARM processors, Graphics Processing Units (GPUs), Digital Signal Processors (DSPs), and the like.

Bus 506 represents one or more of any of a variety of communication bus structures. By way of example, and not limitation, bus 506 may be implemented as a Peripheral Component Interconnect Express (PCIe) bus. Data processing system 500 typically includes a variety of computer system readable media. Such media may include computer-readable volatile and non-volatile media and computer-readable removable and non-removable media.

Memory 504 can include computer-readable media in the form of volatile memory, such as random-access memory (RAM) 508 and/or cache memory 510. Data processing system 500 also can include other removable/non-removable, volatile/non-volatile computer storage media. By way of example, storage system 512 can be provided for reading from and writing to a non-removable, non-volatile magnetic and/or solid-state media (not shown and typically called a "hard drive"), which may be included in storage system 512. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 506 by one or more data media interfaces. Memory 504 is an example of at least one computer program product.

Memory 504 is capable of storing computer-readable program instructions that are executable by processor 502. For example, the computer-readable program instructions can include an operating system, one or more application programs, other program code, and program data. In one or more embodiments, memory 504 may store the executable frameworks of FIGS. 1 and/or 4 as described herein such that processor 502 may execute such frameworks to perform the various operations described herein.

Processor 502, in executing the computer-readable program instructions, is capable of performing the various operations described herein that are attributable to a computer. It should be appreciated that data items used, generated, and/or operated upon by data processing system 500 are functional data structures that impart functionality when employed by data processing system 500. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 500 may include one or more Input/Output (I/O) interfaces 518 coupled to bus 506. I/O interface(s) 518 allow data processing system 500 to communicate with one or more external devices and/or communicate over one or more networks such as a local area network (LAN), a wide area network (WAN), wireless and/or wired networks, and/or a public network (e.g., the Internet). Examples of I/O interfaces 518 may include, but are not limited to, network cards, modems, network adapters, hardware controllers, etc. Examples of external devices also may include devices that allow a user to interact with data processing system 500 (e.g., a display, a keyboard, and/or a pointing device) and/or other devices. Data processing system 500 may include additional devices, e.g., a display, upon which images and/or video using such images generated as described herein may be displayed.

Data processing system 500 is only one example implementation. Data processing system 500 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

The example of FIG. 5 is not intended to suggest any limitation as to the scope of use or functionality of example implementations described herein. Data processing system 500 is an example of computer hardware that is capable of performing the various operations described within this disclosure. In this regard, data processing system 500 may include fewer components than shown or additional components not illustrated in FIG. 5 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

In one or more other embodiments, data processing system 500 or another one similar thereto may be used to implement a server or a client device. In this regard, data processing system 500 may include additional components, devices, peripherals, sensors, and/or systems such as one or more wireless radios and/or transceivers (not shown), an audio system including transducers such as a microphone and speaker, a camera, and/or other available peripheral devices.

Examples of various devices and/or systems that may be implemented using a hardware architecture as illustrated in FIG. 5 and execute the various executable frameworks described herein either individually or in combination with other devices can include one or more of a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television, information appliance, IoT device, server, a virtual reality (VR) system, an augmented reality (AR) system, a mixed reality (MR) system, an extended reality (XR) system, a metaverse system, or the like. In another example, the hardware architecture of FIG. 5 may be used to implement a kiosk or other computing or information appliance configured with a video display, a camera, and/or audio capabilities (e.g., input transducer such as a microphone and output transducer such as a speaker) that may be positioned so as to be accessible by a user or a plurality of different users over time.

The inventive arrangements described herein may be used to generate digital humans within virtual computing environments, e.g., metaverse worlds. The digital humans may be generated in high resolution for use as avatars, for example. The high-quality and high resolution achieved is suitable for such environments where close-up interaction with the digital human is likely. Different example contexts and/or use cases in which framework 100 may be used, particularly in the case where digital humans are conveyed as the content are discussed below.

In one or more embodiments, framework 100 may be used to generate or provide a virtual assistant. The virtual assistant may be presented on a device within a business or other entity such as a restaurant. The device may present the virtual assistant embodied as a digital human driven by framework 100 in lieu of other conventional kiosks found in restaurants and, in particular, fast-food establishments. The device, driven by framework 100, may present a digital human configured to operate as a virtual assistant that is pre-programmed to help with food ordering. The virtual assistant can be configured to answer questions regarding, for example, ingredients, allergy concerns, or other concerns as to the menu offered by the restaurant.

The inventive arrangements described herein also may be used to generate digital humans that may be used as, or function as, virtual news anchors, presenters, greeters, receptionists, coaches, and/or influencers. Example use cases may include, but are not limited to, a digital human performing a daily news-reading, a digital human functioning as a presenter in a promotional or announcement video, a digital human presented in a store or other place of business to interact with users to answer basic questions, a digital human operating as a receptionist in a place of business such as a hotel room, vacation rental, or other attraction/venue. Use cases include those in which accurate mouths and/or lip motion for enhanced realism is preferred, needed, or required. Coaches and influencers would be able to create virtual digital humans of themselves which will help them to scale and still deliver personalized experiences to end users.

In one or more other examples, digital humans generated in accordance with the inventive arrangements described herein may be included in artificial intelligence (AI) chat bot and/or virtual assistant applications as a visual supplement. Adding a visual component in the form of a digital human to an automated or AI enabled chat bot may provide a degree of humanity to user-computer interactions. The disclosed technology can be used as a visual component and displayed in a display device as may be paired or used with a smart-speaker virtual assistant to make interactions more human-like. The cache-based system described herein maintains the illusion of realism.

In one or more examples the virtual chat assistant may not only message (e.g., send text messages) into a chat with a user, but also have a visual human-like form that reads the answer. Based on the disclosed technology, the virtual assistant can be conditioned on both the audio and head position while keeping high quality rendering of the mouth.

In one or more other examples, framework 100 may be used in the context of content creation. For example, an online video streamer or other content creator (including, but not limited to, short-form video, ephemeral media, and/or other social media) can use framework 100 to automatically create videos instead of recording themselves. The content creator may make various video tutorials, reviews, reports, etc. using digital humans thereby allowing the content creator to create content more efficiently and scale up faster.

The inventive arrangements may be used to provide artificial/digital/virtual humans present across many vertical industries including, but not limited to, hospitality and service industries (e.g., hotel concierge, bank teller), retail industries (e.g., informational agents at physical stores or virtual stores), healthcare industries (e.g., in office or virtual informational assistants), home (e.g., virtual assistants, or implemented into other smart appliances, refrigerators, washers, dryers, and devices), and more. When powered by business intelligence or trained for content specific conversations, artificial/digital/virtual humans become a versatile front-facing solution to improve user experiences.

The inventive arrangements are capable of communicating naturally, responding in contextualized exchanges, and interacting with real humans in an efficient manner with reduced latency and reduced computational overhead.

In one or more other embodiments, framework 100 may be used with or as part of an online video gaming system or network.

Figure 6:
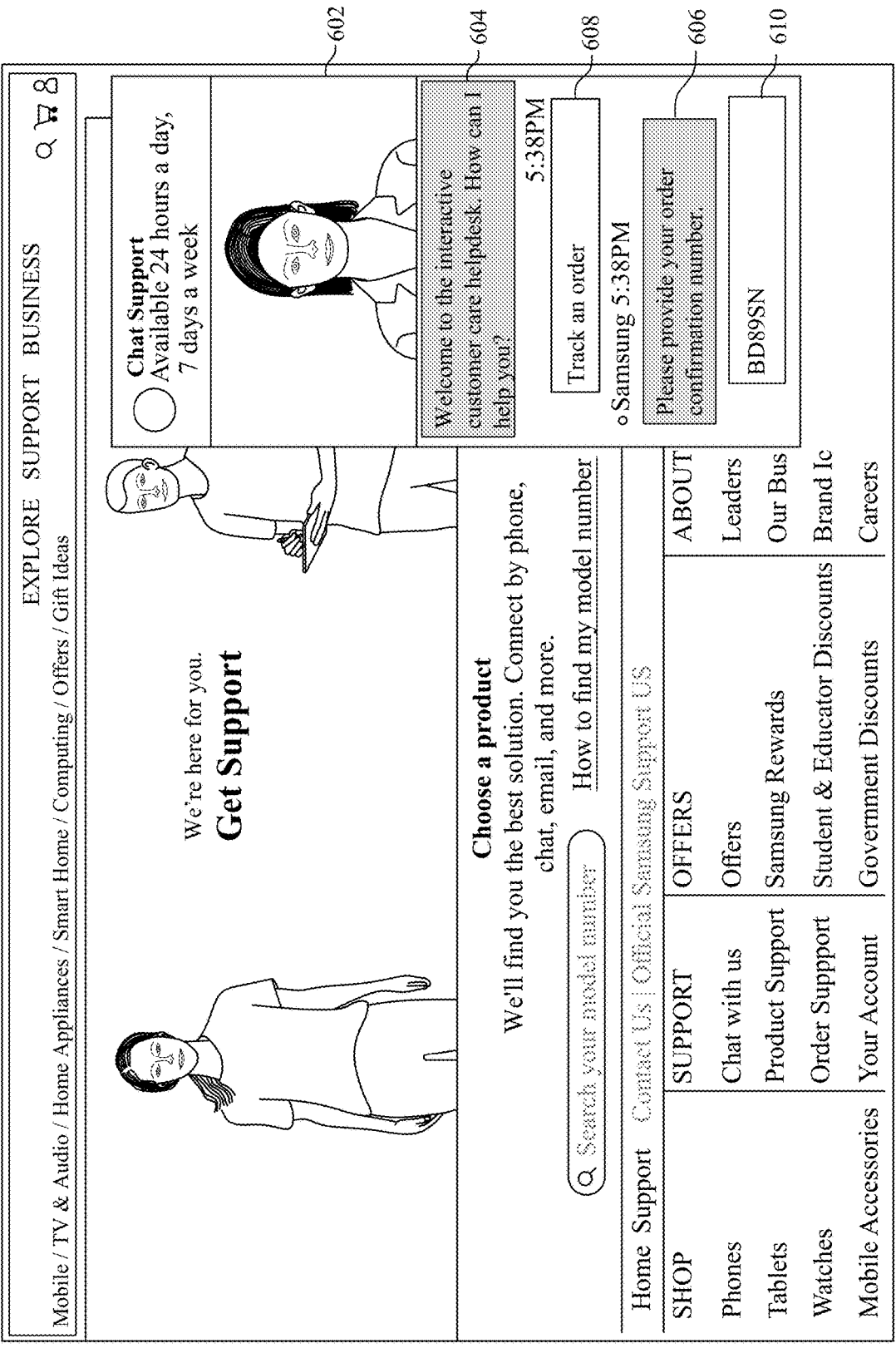
FIG. 6 illustrates an example implementation in which a framework in accordance with the inventive arrangements is used in the context of chat support.

FIG. 6 illustrates an example implementation in which framework 100 is used in the context of chat support. In the example, a view generated by data processing system 500 as may be displayed on a display screen is shown. In the example, region 602 displays content generated by framework 100 as may be executed by data processing system 500 or another system and delivered to data processing system 500. In the example, the digital human shown speaks the target responses that are also conveyed as text messages 604, 606. The user response is shown as text message 608. Further, the user is able to interact with the digital human by way of the field 610 whether by voice or typing. For example, framework 100 may be used in combination with a chat bot or an AI-driven chat bot to generate one or more images that may be displayed or rendered sequentially as a video animation of the digital human.

Figure 7:
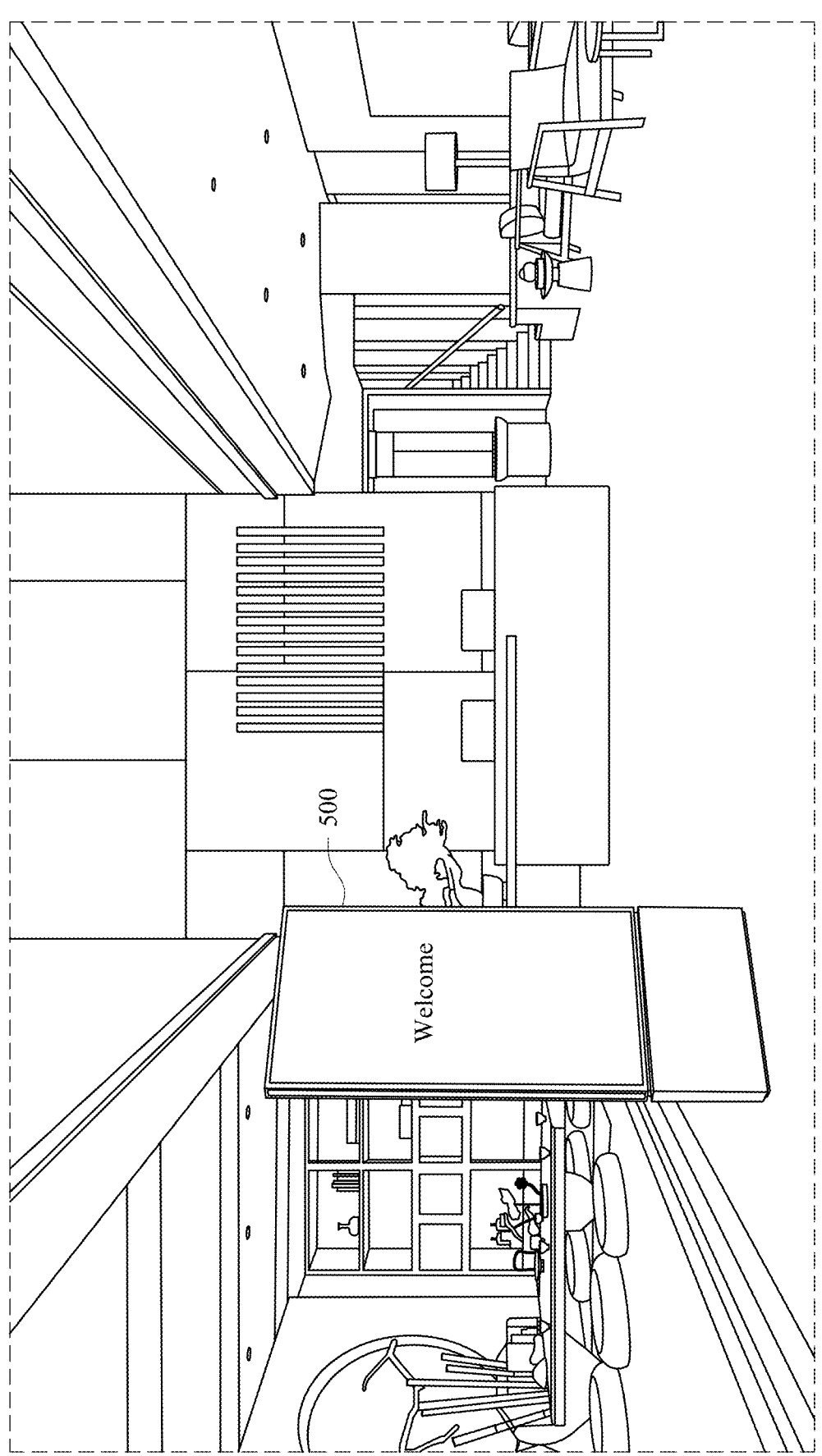
FIG. 7 illustrates an example in which a data processing system executing the framework described in accordance with the inventive arrangements is implemented as a kiosk.

FIG. 7 illustrates an example in which data processing system 500 is implemented as a kiosk having a screen, microphone, optionally a camera or other presence sending device, and display to play content to a user and receive input from the user.

In one or more other example implementations, framework 100 may be incorporated into other collaborative systems that support chat communications. Such systems may include social media systems and/or networks and any such system that may be configured to provide help, support, and/or feedback to users and/or respond to user inputs and/or queries.

FIG. 8 illustrates a method 800 of generating an image in accordance with one or more embodiments of the disclosed technology. Method 800 may be performed by a data processing system as described herein in connection with FIG. 5 executing framework 100.

In block 802, encoded data is generated by encoding input data into a latent space. For example, encoder 102 is capable of encoding input data 108 to generate encoded data 112 within latent space 110. In block 804, encoded data 112 is decoded through a first decoder (e.g., decoder 104) having a plurality of first decoder layers 120 by processing the encoded data 112 through one or more of the plurality of first decoder layers 120. In block 806, encoded data 112 is decoded through a second decoder (e.g., decoder 106) having a plurality of second decoder layers 130 by processing the encoded data 112 through one or more of the plurality of second decoder layers 130.

In block 808, a second feature map output from the selected layer of the plurality of second decoder layers is resized to correspond to a size of a portion 206 of a first feature map output from the selected layer of the plurality of first decoder layers to be removed therefrom. For example, resizer 202 is capable of resizing feature map 132-(N-1) to a size that matches the portion 206 of feature map 122-(M-1) to be replaced.

In block 810, an updated feature map 150 is generated by replacing the portion 206 of the first feature map output from a selected layer of the plurality of first decoder layers with the second feature map output from a selected layer of the plurality of second decoder layers. For example, decoder 104 is capable of generating updated feature map 150 by replacing (at least) a portion 206 of feature map 122-(M-1) output from the selected layer (e.g., layer 120-(M-1)). In block 812, an image is generated by further decoding the updated feature map 150 through one or more additional layers of the plurality of first decoder layers. For example, decoder 104 generates image 114 by further decoding updated feature map 150 through one or more additional layers such as layer 120-M.

In another aspect, the selected layer of the plurality of first decoder layers 120 is a penultimate layer of the plurality of first decoder layers 120.

In another aspect, the selected layer of the plurality of second decoder layers 130 is a penultimate layer of the plurality of second decoder layers 130. As noted, the penultimate layer may refer to the layer hierarchy of the second decoder during training and prior to pruning of the last layer for inference.

In another aspect, the image, e.g. image 114, is an RGB image.

In another aspect, the first decoder is trained to generate images including a face of a digital human.

In another aspect, the second decoder is trained to generate images including a mouth of the digital human.

In another aspect, encoded data 112 may be decoded through one or more additional decoders 106 each having a plurality decoder layers. Each of the one or more additional decoders 106 is capable of processing the encoded data 112 through one or more of the plurality of decoder layers. In that case, the updated feature map 150 is generated by replacing one or more additional portions of the first feature map (e.g., 122-(M-1)) with a further feature map (e.g., a respective feature map), or at least a portion thereof, output from a selected layer of the plurality of decoder layers from each of the one or more additional decoders.

In another aspect, an output from a final layer of the plurality of second decoder layers of the second decoder is used only during training of the second decoder. For example, image 116 is not utilized during runtime (e.g., inference). Image 116 is used for purposes of training involving decoder 106.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," and similar language throughout this disclosure may, but do not necessarily, all refer to the same embodiment. The terms "embodiment" and "arrangement" are used interchangeably within this disclosure.

As defined herein, the term "output" means storing in physical memory elements, e.g., devices, writing to a display or other peripheral output device, sending or transmitting to another system, exporting, or the like.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), Graphics Processing Unit (GPU), a field-programmable gate array (FPGA), a programmable logic array (PLA), an application specific integrated circuit (ASIC), programmable logic circuitry, and a controller.

As defined herein, the term "responsive to" and similar language as described above, e.g., "if," "when," or "upon," mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the disclosed technology. Within this disclosure, the term "program code" is used interchangeably with the terms "computer readable program instructions" and "program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
generating encoded data by encoding input data into a latent space;
decoding the encoded data through a first decoder having a plurality of first decoder layers by processing the encoded data through one or more of the plurality of first decoder layers;
decoding the encoded data through a second decoder having a plurality of second decoder layers by processing the encoded data through one or more of the plurality of second decoder layers;
generating an updated feature map by replacing at least a portion of a first feature map output from a selected layer of the plurality of first decoder layers with at least a portion of a second feature map output from a selected layer of the plurality of second decoder layers; and
generating an image by further decoding the updated feature map through one or more additional layers of the plurality of first decoder layers.

2. The method of claim 1, wherein the selected layer of the plurality of first decoder layers is a penultimate layer of the plurality of first decoder layers.

3. The method of claim 1, wherein the selected layer of the plurality of second decoder layers is a penultimate layer of the plurality of second decoder layers.

4. The method of claim 1, further comprising:
resizing the second feature map to correspond to a size of the portion of the first feature map.

5. The method of claim 1, wherein the image is a red, green, blue image.

6. The method of claim 1, wherein the first decoder is trained to generate images including a face of a digital human.

7. The method of claim 6, wherein the second decoder is trained to generate images including a mouth of the digital human.

8. The method of claim 1, further comprising:
decoding the encoded data through one or more additional decoders each having a plurality decoder layers by processing the encoded data through one or more of the plurality of decoder layers of each of the one or more additional decoders;
wherein the updated feature map is generated by replacing one or more additional portions of the first feature map with a further feature map output from a selected layer of the plurality of decoder layers from each of the one or more additional decoders.

9. The method of claim 1, wherein an output from a final layer of the plurality of second decoder layers of the second decoder is used only during training of the second decoder.

10. A system, comprising:

a processor configured to execute operations including:

generating encoded data by encoding input data into a latent space;

decoding the encoded data through a first decoder having a plurality of first decoder layers by processing the encoded data through one or more of the plurality of first decoder layers;

decoding the encoded data through a second decoder having a plurality of second decoder layers by processing the encoded data through one or more of the plurality of second decoder layers;

generating an updated feature map by replacing at least a portion of a first feature map output from a selected layer of the plurality of first decoder layers with at least a portion of a second feature map output from a selected layer of the plurality of second decoder layers; and generating an image by further decoding the updated feature map through one or more additional layers of the plurality of first decoder layers.

11. The system of claim 10, wherein the selected layer of the plurality of first decoder layers is a penultimate layer of the plurality of first decoder layers.

12. The system of claim 10, wherein the selected layer of the plurality of second decoder layers is a penultimate layer of the plurality of second decoder layers.

13. The system of claim 10, wherein the processor is configured to execute operations comprising:

resizing the second feature map to correspond to a size of the portion of the first feature map.

14. The system of claim 10, wherein the image is a red, green, blue image.

15. The system of claim 10, wherein the first decoder is trained to generate images including a face of a digital human.

16. The system of claim 15, wherein the second decoder is trained to generate images including a mouth of the digital human.

17. The system of claim 10, wherein the processor is configured to execute operations comprising:

decoding the encoded data through one or more additional decoders each having a plurality decoder layers by processing the encoded data through one or more of the plurality of decoder layers of each of the one or more additional decoders;

wherein the updated feature map is generated by replacing one or more additional portions of the first feature map with a further feature map output from a selected layer of the plurality of decoder layers from each of the one or more additional decoders.

18. A system, comprising:

an encoder configured to generate encoded data by encoding input data into a latent space;

a first decoder having a plurality of first decoder layers, wherein the first decoder is configured to decode the encoded data through one or more of the plurality of first decoder layers; and a second decoder having a plurality of second decoder layers, wherein the second decoder is configured to decode the encoded data through one or more of the plurality of second decoder layers;

wherein the first decoder is configured to generate an updated feature map by replacing at least a portion of a first feature map output from a selected layer of the plurality of first decoder layers with at least a portion of a second feature map output from a selected layer of the plurality of second decoder layers; and wherein the first decoder is further configured to generate an image by further decoding the updated feature map through one or more additional layers of the plurality of first decoder layers.

19. The system of claim 18, wherein the selected layer of the plurality of first decoder layers is a penultimate layer of the plurality of first decoder layers.

20. The system of claim 18, further comprising:

a resizer configured to resize the second feature map to correspond to a size of the portion of the first feature map output from the selected layer of the plurality of first decoder layers.

* * * * *